(12) United States Patent
Wollack et al.

(10) Patent No.: US 8,693,828 B2
(45) Date of Patent: Apr. 8, 2014

(54) PHOTONIC CHOKE-JOINTS FOR DUAL POLARIZATION WAVEGUIDES

(75) Inventors: Edward J. Wollack, Clarksville, MD (US); Kongpop U-Yen, Arlington, VA (US); David T. Chuss, Bowie, MD (US)

(73) Assignee: The United States of America as represented by the Administrator of the National Aeronautics Space Administration, Washington, DC (US)

( * ) Notice: Subject to any disclaimer, the term of this patent is extended or adjusted under 35 U.S.C. 154(b) by 393 days.

(21) Appl. No.: 13/104,538

(22) Filed: May 10, 2011

(65) Prior Publication Data

US 2011/0280518 A1    Nov. 17, 2011

Related U.S. Application Data

(60) Provisional application No. 61/333,395, filed on May 11, 2010.

(51) Int. Cl.
*G02B 6/36* (2006.01)

(52) U.S. Cl.
USPC .......................................................... 385/50

(58) Field of Classification Search
None
See application file for complete search history.

(56) References Cited

U.S. PATENT DOCUMENTS

| 7,422,375 | B2 * | 9/2008 | Suzuki et al. .................... 385/58 |
| 8,115,565 | B2 * | 2/2012 | Ligander et al. ............ 333/21 A |
| 2007/0086707 | A1 * | 4/2007 | Suzuki et al. .................... 385/58 |
| 2011/0280518 | A1 * | 11/2011 | Wollack et al. ................. 385/50 |

* cited by examiner

*Primary Examiner* — Mark Robinson
*Assistant Examiner* — Andrew Jordan

(57) ABSTRACT

A waveguide structure for a dual polarization waveguide includes a first flange member, a second flange member, and a waveguide member disposed in each of the first flange member and second flange member. The first flange member and the second flange member are configured to be coupled together in a spaced-apart relationship separated by a gap. The first flange member has a substantially smooth surface, and the second flange member has an array of two-dimensional pillar structures formed therein.

20 Claims, 9 Drawing Sheets

PHOTONIC CHOKE-JOINTS FOR DUAL POLARIZATION WAVEGUIDES

CROSS-REFERENCE TO RELATED APPLICATION

This application claims priority to, and the benefit of, U.S. Provisional Patent Application Ser. No. 61/333,395, filed on May 11, 2010, the disclosure of which is incorporated herein by reference in its entirety.

GOVERNMENT LICENSE RIGHTS

This invention was made with government support under ROSS/APRA proposal number 06-APRA06-11, awarded by the National Aeronautics and Space Administration. The government has certain rights in the invention.

BACKGROUND

The present disclosure generally relates to waveguide joints, and more particularly, to a photonic choke joint structure for dual-polarization single-mode waveguides.

A waveguide joint is the location where two waveguides are connected or coupled to produce a reliable contact between two waveguide components, and typically provides an interface for a variety of modularized waveguide components. In general, two waveguides must be accurately aligned and have a low impedance electrical contact at the joint. Typically, this is done by having the two flat metallic waveguide flange surfaces make physical contact at the interface.

Ideally, a waveguide joint is lossless and reflectionless. In practice, it is sometimes necessary and/or desirable to realize this property with a non-contacting waveguide joint interface. For example, in some applications that require thermal isolation at the joint, the physical contact interface cannot be achieved. Without good electrical contact between two waveguide flanges, a few key problems arise. One problem is that the spacing between the mating or coupling surfaces of the two waveguides produces power leakage and reduces the efficiency of the joint. Another is that the spacing or gap between the two waveguides, also referred to as the flange interface, can produce spurious responses that interfere with the transmission in the waveguide. These spurious responses are highly dependent on the gap spacing and the shape of the waveguide. Finally, the gap also sets the limit in the waveguide breakdown voltage and its maximum operating power.

A half-wave choke structure at the flange interface requires good electrical contact and allows the joint to handle high power. One example of such a structure for a single-mode waveguide is the hexagonal tiling of metallic square pillars. The hexagonal tiling has been used for a standard 2.000:1 rectangular waveguide. However, this hexagonal tiling structure does not support dual polarization signal transmission. The half-wave choke structure also has a limited operating bandwidth and does not provide thermal isolation between the two waveguides. A hexagonal tiling photonic choke flange produces a broadband response and a low loss contact interface. However, the hexagonal tiling photonic choke flange structure does not have four-fold symmetry and produces spurious responses when this interface is used in a waveguide with dual polarization.

Accordingly, it would be desirable to provide a system that addresses at least some of the problems identified above.

BRIEF DESCRIPTION

As described herein, the exemplary embodiments overcome one or more of the above or other disadvantages known in the art.

One aspect of the exemplary embodiments relates to a waveguide structure for a dual polarization waveguide. In one exemplary embodiment, the waveguide structure includes a first flange member, a second flange member, and a waveguide member disposed in each of the first flange member and second flange member. The first flange member and the second flange member are configured to be coupled together in a spaced-apart relationship separated by a gap. The first flange member has a substantially smooth surface, and the second flange member has an array of two-dimensional pillar structures formed therein.

Another aspect of the exemplary embodiments relates to a photonic choke joint. In one exemplary embodiment, the photonic choke joint includes a first flange member having a substantially flat surface, a second flange member having a plurality of pillar structures formed therein and a square dual-polarization waveguide disposed in each of the first and second flange members. The plurality of pillar structures are arranged in a Cartesian tiling pattern.

A further aspect of the exemplary embodiments relates to a photonic choke joint. In one exemplary embodiment, the photonic choke joint includes a first flange member having a substantially flat surface and a second flange member having a plurality of pillar structures formed therein. The pillar structures are arranged in an Archimedean tiling pattern. A dual-polarization waveguide is disposed in each of the first and second flange members.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION

Figure 1:
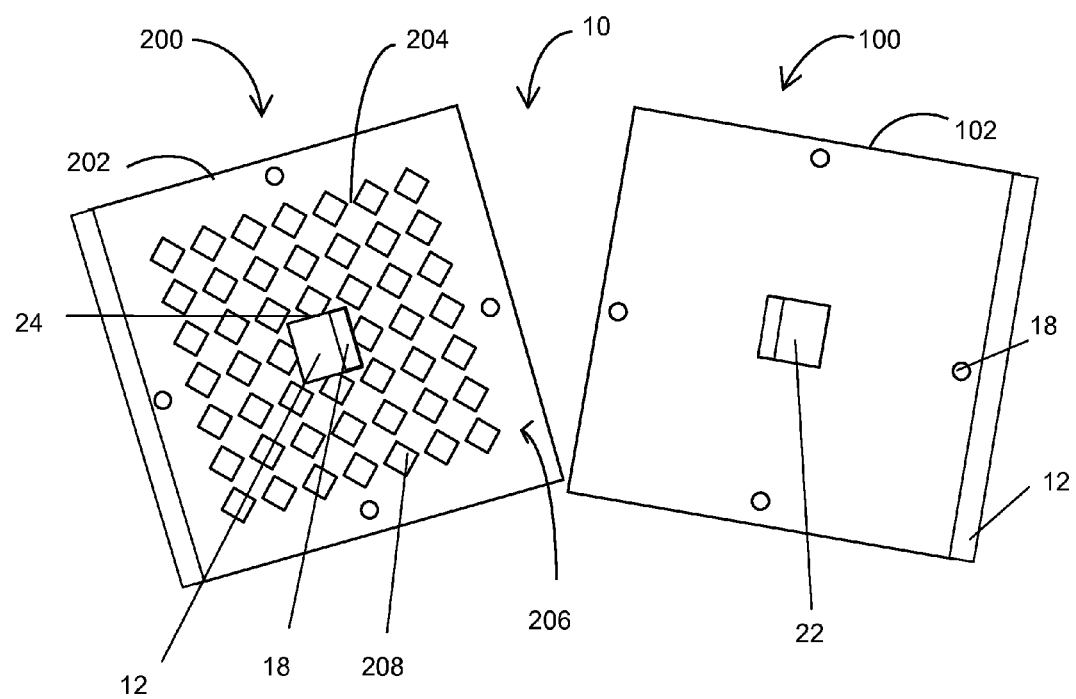
FIG. 1 is a perspective view of a waveguide structure incorporating aspects of the exemplary embodiments.

Referring to FIG. 1, an exemplary waveguide interface structure incorporating aspects of the exemplary embodiments is generally designated by reference numeral 10. The aspects of the exemplary embodiments are directed to a reliable, highly efficient, and non-contact joint for waveguides with dual-polarizations. Common examples of dual-polarization waveguides include waveguide structures with square, round and quad-ridge cross-sectional geometries. The aspects of the exemplary embodiments will generally be described with respect to a square waveguide, although waveguides of other cross-sectional geometries are contemplated within the scope of the exemplary embodiments. In one exemplary embodiment, the waveguide interface structure 10 will also be referred to as a "photonic choke joint" (PCJ).

The aspects of the exemplary embodiments generally provide a dual-mode waveguide interface structure 10 that includes two flanges 100, 200. FIG. 2a illustrates a plan view of the waveguide interface structure 10 prior to assembly, while FIG. 2b illustrates a plan view of the assembled waveguide interface structure 10. FIG. 2c illustrates a cross-sectional view of the waveguide interface structure 10 shown in FIG. 2b, taken along the line A-A'.

As shown in FIGS. 2(a)-2(c), a waveguide 12 is disposed in each of the flanges 100, 200. The portions of the waveguide 12 in each of the flanges 100, 200 are generally referred to as waveguide ports 22, 24, respectively. The first waveguide flange 100, also referred to as flange 100, generally includes a substantially flat or smooth surface 102, which may also be referred to as electrically reflective. The surface 102 of the first waveguide flange 100 generally includes the equivalent of a perfect electrical conductor wall. The surface 102 is substantially perpendicular to the wall 18 of the waveguide 12. The second waveguide flange 200, also referred to as flange 200, generally includes a surface 202 comprising an infinite period two-dimensional array 204 of metallic structures. As is illustrated in the example of FIG. 1, the array 204 generally includes rows 206 of pillars 208. In one exemplary embodiment, the rows 206 of pillars 208 can be tiled in either Cartesian or Archimedean patterns, as will be further described herein.

When combined with the substantially flat surface 102 of the first flange 100, the electrical model of the waveguide structure 10 becomes an infinite three-dimensional tiling of pillars due to the self-mirroring of the structure. This produces a reflective response to an excited wave at certain frequency ranges that can be dependent on factors such as the pillar shape, and spacing among and between the pillars, for example.

Figure 2:
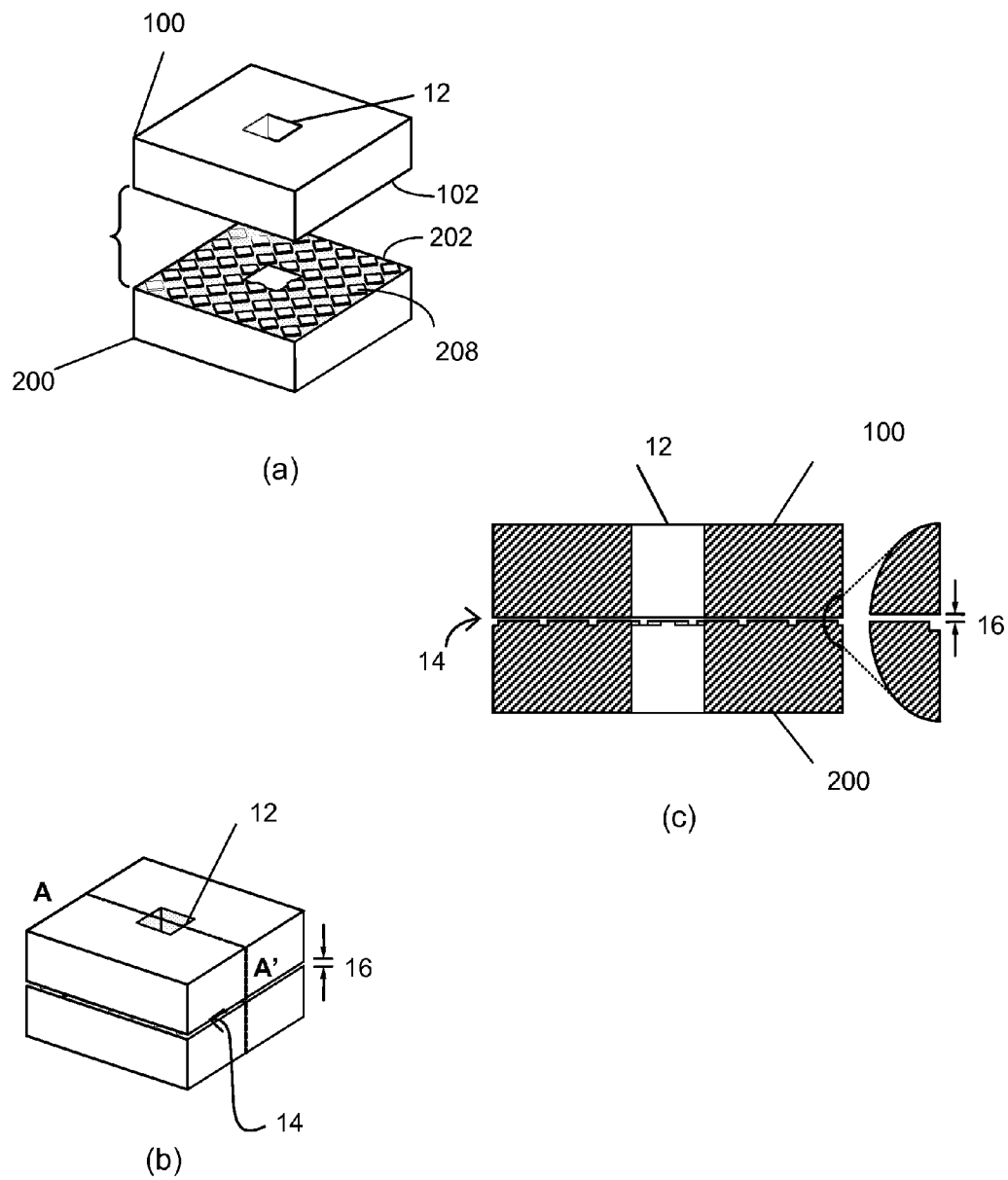
FIG. 2(a) is an assembly view.
FIG. 2(b) is a plan view.
FIG. 2(c) is a side cross-sectional view of the waveguide structure of FIG. 1.

In one exemplary embodiment, the waveguide structure 10 produces a highly reflective band-stop filter at the wave guide flange interface or joint 14, shown, for example, in FIG. 2. The waves that are introduced into the interface 14 will see a highly reflective surface and see the joint 14 as an electrical short circuit in the operating frequency band. The signal therefore continues to propagate along its path in and through the waveguide 12 rather than into the joint 14. The Cartesian and Archimedean tiling patterns have four-fold and eight-fold symmetry, respectively, and two polarized signals in the dual-polarized waveguide structure 10 realizes the same impedance characteristics at the joint 14. The tiling patterns need to have four-fold or higher symmetry for dual polarization guiding structures. With four-fold or higher symmetry, each of the polarizations encounters the same boundary conditions upon interacting with the joint 14. As a result, the frequency response of the waveguide structure 10, when excited by signals in two polarizations, is substantially identical. In addition, the size of the pillars array 204 determines the level of leakage around the center of the operating band.

Figure 3:
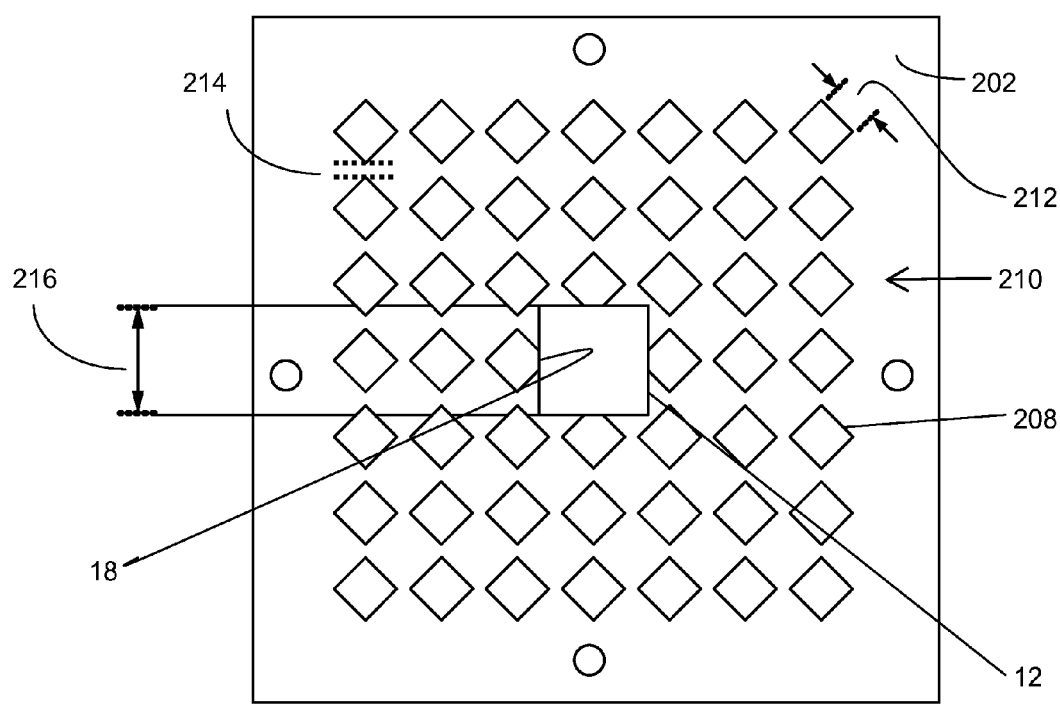
FIG. 3 is a plan view of one embodiment of a Cartesian tiling configuration of pillars in a photonic choke joint incorporating aspects of the exemplary embodiments.
Figure 4:
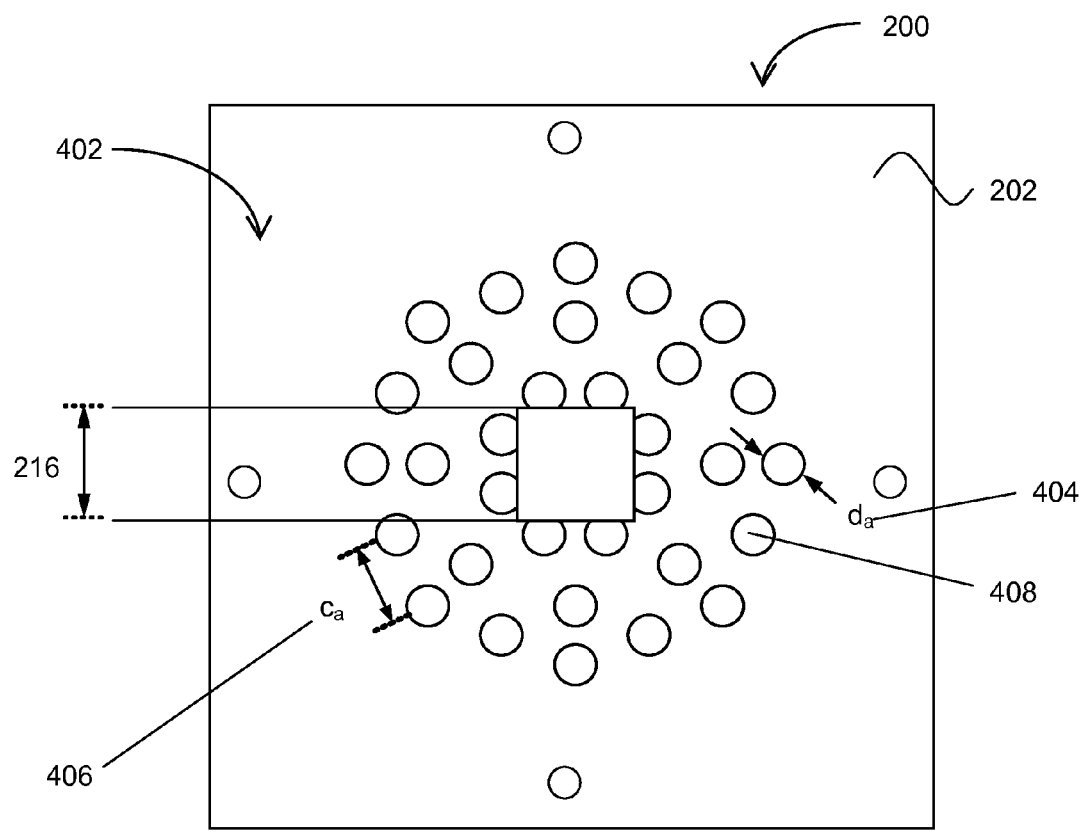
FIG. 4 is a plan view of an Archimedean tiling configuration of pillars in a photonic choke joint incorporating aspects of the exemplary embodiments.

Referring to FIGS. 3 and 4, the aspects of the exemplary embodiments use tiling arrangements that are suitable for waveguide implementation in terms of ease of fabrication and design. For fabrication simplicity, the pillars 208 are metallic, with either a square cross-section arranged in four-fold translation symmetry, as illustrated in FIG. 3, or a circular cross-section arranged in eight-fold rotational symmetry, as illustrated in FIG. 4. The configuration shown in FIG. 3 is referred to herein as "Cartesian" PCJ tiling, while the configuration shown in FIG. 4 is referred to herein as "Archimedean" or "octagonal" tiling.

Referring to FIG. 2(b), the parallelism of the flanges 100, 200 is controlled, as is the size of the separation or gap 16 between the two flanges 100, 200 at the interface 14. The gap 16 generally includes a spacing between a top surface of the pillar 208, generally referred to as 202 and the upper metal reflective plane, generally referred to as 102.

Referring to FIG. 3, in this exemplary embodiment, the flange 200 includes a Cartesian tiling scheme 210 of square pillars 208 that are rotated relative to orientation of the walls 18 of waveguide 12. Each pillar 208 has a width generally indicated by 212. A spacing or distance between adjacent pillars 208 is generally indicated by 214. The width 212 and spacing 214 are tuned relative to a width 216 of the waveguide 12, also referred to herein as "waveguide width 216." The term "waveguide width" is generally understood in the art as referring to the guide's broadwall width (e.g., for a standard WR22.4 rectangular waveguide the width "a" of the guide is 0.224 inches, and the height "b" is 0.112 inches). The aspects of the exemplary embodiments allow the waveguide structure to be scaled to operate in any waveguide band.

The orientation of the pillars 208 with respect to the laterally-propagating waves is configured to provide the maximum confinement. Where the waveguide 12 is square, as shown in the example of FIG. 3, the majority of the constituent transmission modes propagate in a direction that is generally perpendicular to the walls 18 of the waveguide 12.

Figure 5:
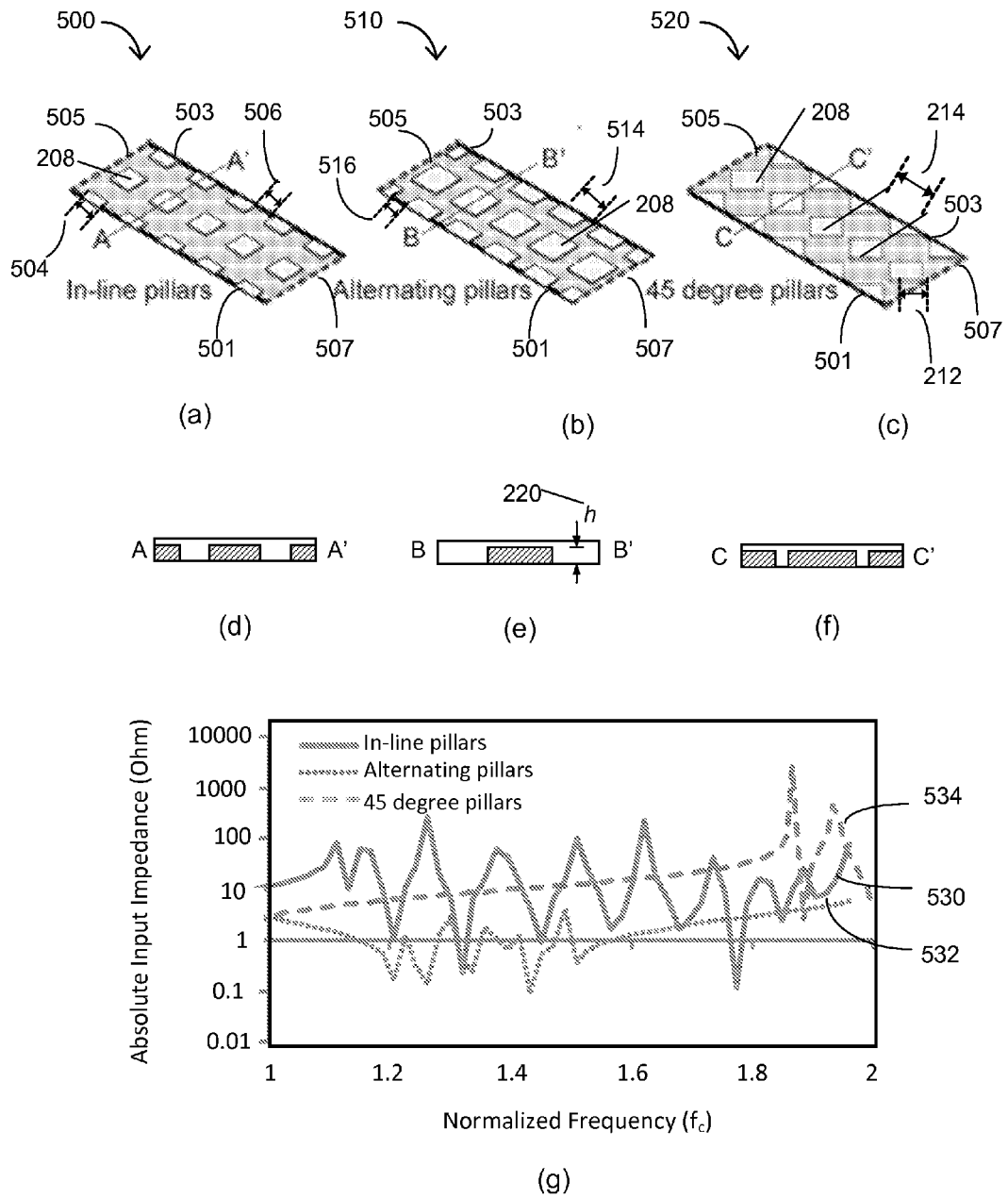
FIGS. 5(a), 5(b), and 5(c) illustrate plan views of exemplary pillar configurations.
FIGS. 5(d), 5(e), and 5(f) are cross-sectional views of each pillar configuration, respectively.
FIG. 5(g) illustrates the simulated input impedance effectiveness of each respective pillar configuration in a photonic choke joint incorporating aspects of the exemplary embodiments.

FIGS. 5(a)-5(c) illustrate plan views of exemplary pillar configurations. In FIG. 5a, the pillars 208 are shown in "in-line" configuration 500, each pillar 208 having a width 504 and a spacing 506 between each pillar 208. Lines 501 and 503 illustrate the magnetic wall of the flange 200, while lines 505 and 507 illustrate the plane wave excitation port. FIG. 5(d) is a cross-sectional view of the inline configuration 500 taken along the line A-A'.

In FIG. 5(b), the each pillar 208 is arranged in an "alternating" configuration 510, each pillar 208 having a width 516 and a spacing 516 between each pillar 208. FIG. 5(e) is a cross-sectional view of the alternating configuration 510 taken along the line B-B'.

In FIG. 5(c), the pillars 208 of FIGS. 5(a) and 5(b) are rotated approximately 45 degrees relative to the orientation of the walls 18 of the square waveguide 12 shown in FIG. 3. The pillars 208 form a 45-degree rotated pillar configuration 520. Each pillar 208 in this exemplary embodiment has a width 212, with a spacing 214 between each. FIG. 5(f) is a cross-sectional view of the 45-degree pillar configuration 520 taken along the line C-C'.

Referring to FIG. 5(a), it was observed during modeling, that a Cartesian tiling arrangement of five rows of pillars 208 in an inline configuration 500, relative to the walls 18 of the waveguide 12 shown in FIG. 3, produces the highest input impedance with numerous in-band spurious responses, as is illustrated by line 530 in the graph shown in FIG. 5(g). The graph in FIG. 5(g) illustrates the input impedance effectiveness of each of the configurations shown in FIGS. 5(a)-5(c). In the example of FIG. 5(a), the width 504 of each pillar 208 in the inline configuration 500 is approximately 0.6a, where "a" represents the waveguide width 216 described above, and shown in FIG. 3, for the particular waveguide design being used. In this example, the spacing 506 between adjacent pillars 208 is approximately 1.12a. With an offset or alternating arrangement 510 of pillars 208, the lowest input impedance is produced, as illustrated by line 532 in the graph, corresponding to the alternating pillar arrangement 516. The width 514 of each pillar 208 in the alternating configuration 510 is approximately 0.75a, while the spacing 516 between adjacent pillars 208 is approximately 1.12a. However, the alternating tiling configuration 510 of pillars 208 does not produce the desired symmetrical response in the square waveguide 12 due to the lack of four-fold symmetry. The exemplary 45-degree rotated pillar configuration 520 shown in FIGS. 3 and 5(c) provides the maximum confinement of the laterally-propagating waves and provides the lowest input impedance, shown by line 534, compared to the characteristic impedance of free space in order to create the stop band over a large bandwidth. In the rotated configuration example shown in FIG. 5(c), the width 212 of each rotated pillar 208 is approximately 0.4a, while the spacing 214 between adjacent rotated pillars 208 is approximately 0.68a. It is noted that a height 220 of the rotated pillars 208 and the flange spacing 216 has a substantially insignificant effect on the input impedance response. In one exemplary embodiment, the height 220 of each rotated pillar 208 is approximately 0.037a, while the spacing 216 between the flanges 100, 200 is simulated in this example to be approximately 0.0088a, for each of the inline 500, alternating 510 and rotated 520 arrangements.

Figure 6:
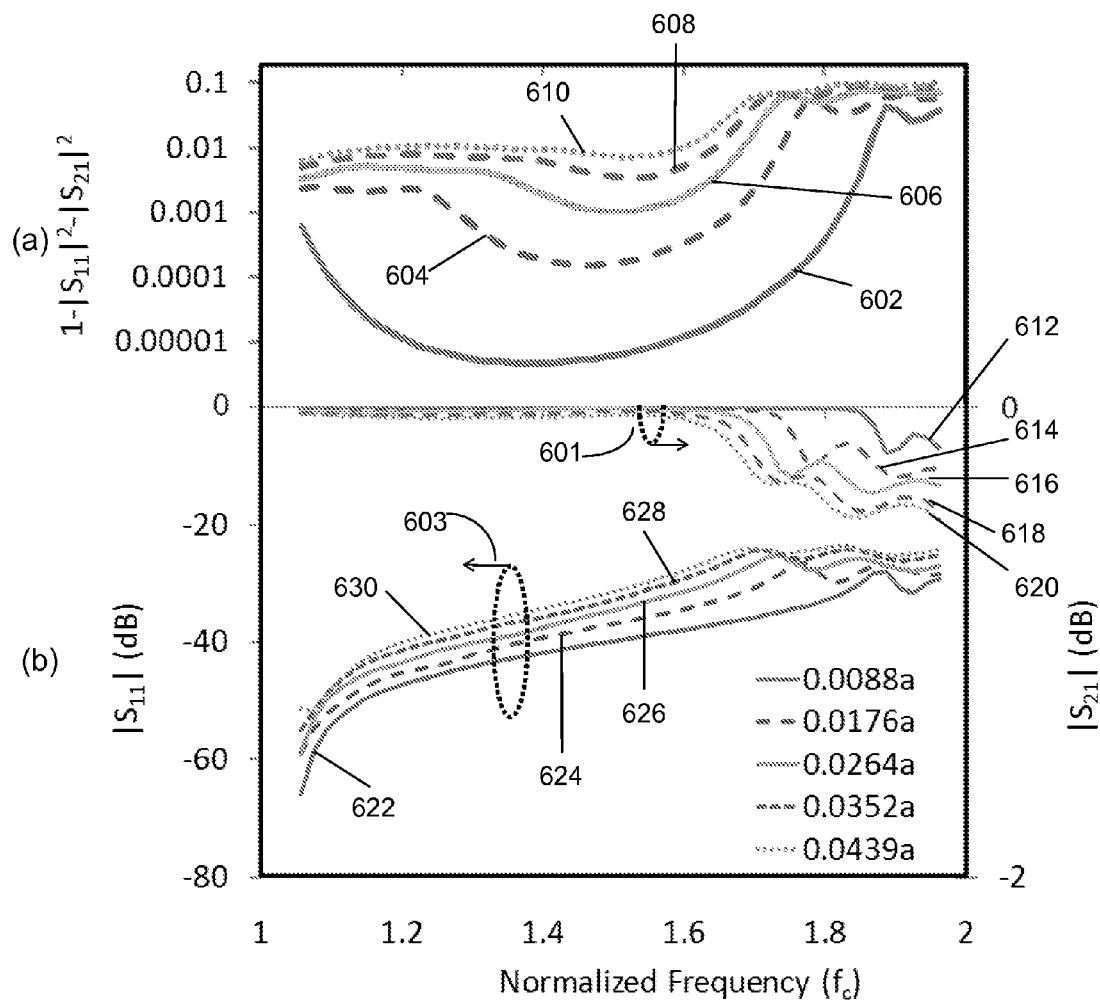
FIGS. 6(a) and 6(b) illustrate the simulated power leakage, transmission, and reflection for an exemplary Cartesian tiling configuration in a photonic choke joint incorporating aspects of the exemplary embodiments.

To achieve the desired field confinement for the waveguide structure 10 to function nearly ideally, at least three rows of pillars 208 must be used in the 45-degree rotated pillar configuration 520. FIGS. 6(a) and 6(b) illustrate the simulated power leakage, transmission and reflection of a waveguide structure 10 incorporating Cartesian tiling in accordance with the aspects of the exemplary embodiments, having three rows 206 of rotated pillars 208. FIG. 6(a) illustrates the total power lost, the total power less the power reflected and transmitted by the structure 10 incorporating Cartesian tiling. In FIG. 6(b), the set of curves 601 illustrates the power transmission loss in [dB], with reference to the right axis, while the set of curves 603 illustrate the power reflection from the joint 14, with reference to the left axis.

In the example of FIGS. 6(a) and 6(b), the width 212 of each pillar 208 is approximately 0.68a, while the spacing 214 between adjacent pillars 208 is approximately 0.4a. The parameter that is varied, represented by the lines 602-630 on the graphs, is the gap 16 between the non-contacting surfaces of the flanges 100, 200, which is varied in the range of approximately 0.0088a to 0.0439a. Lines 602, 612 and 622 are for a gap spacing of 0.0088a. Lines 604, 614 and 624 are for a gap spacing of 0.0176a. Lines 606, 616 and 626 are for a gap spacing of 0.0264a. Lines 608, 618 and 628 are for a gap spacing of 0.0352a. Lines 610, 620 and 630 are for a gap spacing of 0.0439a. The results show that the waveguide structure 10 in this embodiment produces a leakage of less than 0.001 up to 1.61 $f_c$, where $f_c$ is the cutoff frequency of the parent waveguide structure, when the spacing 16 between the flanges 100, 200 is below 0.0088a. The cutoff frequency $f_c$ is the frequency at which the fields are "cutoff" and do not propagate down the waveguide 12. This frequency $f_c$ is related to the width 216, the guide broadwall width "a", by $f_c = co/(2a)$, where co is the speed of light in freespace. FIGS. 6(a) and 6(b) are plotted in these units because one can convert the x-axis to physical units (e.g., GHz) by suitably multiplying by the cutoff frequency $f_c$ for the waveguide in use. In so called "full" waveguide band applications, where $1 < f_c < 2$, strictly speaking for a square guide, the waveguide is only single mode over a smaller range; however, with appropriate care, steps can be taken to use the commonly used language for a 2.000:1 rectangular guide. The power leakage is determined by the S-parameter relationship: $1 - |S_{21}|^2 - |S_{11}|^2$, since the signals at both waveguide ports 22, 24 are highly symmetric. The Cartesian configuration of pillars 208 provides reflections that are less than −24 dB without in-band spurious response to approximately 1.82 $f_c$. The power leakage of less than 1% can be maintained when the gap spacing 214 is less than approximately 0.035a. Generally, the gap spacing 16 between the flanges 100, 200, can vary from approximately 0.0088a to 0.0352a, inclusive of endpoints. When the gap spacing 16 is substantially zero, a constant loss is observed across the measurement band. As the gap spacing 16 is increased, the high frequency response is degraded. Low in-band power leakage of less than approximately 3% is realized when the gap spacing 16 is smaller than 0.028a (e.g. 0.16 mm).

Figure 7:
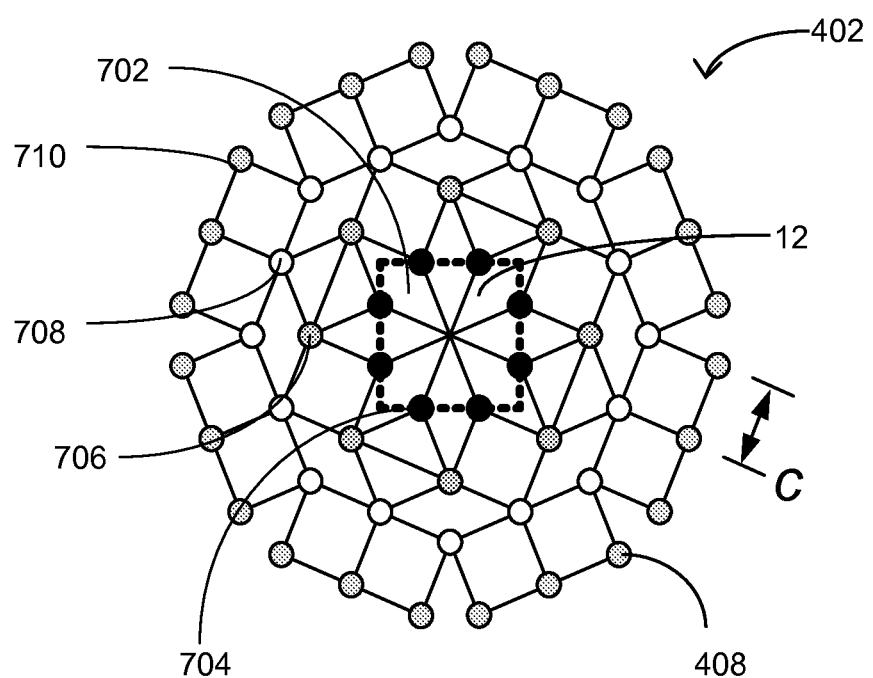
FIG. 7 illustrates an exemplary layout of pillars for an Archimedean tiling configuration for a photonic choke joint incorporating aspects of the exemplary embodiments.

Referring to FIG. 4, in one exemplary embodiment, the second flange 200 includes an arrangement 402 of circular pillars 408. As is shown in FIG. 7, in this example, a quasi-crystal arrangement 402 of circular pillars 408, also referred to as an Archimedean tiling arrangement of circular pillars, is used that provides an eight-fold symmetry and a suitable placement of the waveguide 12 at the center 702 of the arrangement 402. In this example, four rows 704, 706, 708 and 710 of circular pillars 408 are placed at the vertices of the quasi-crystal configuration 402. To achieve the desired field confinement, three or more rows of circular pillars 408 need to be used. Generally, an improvement in performance of the waveguide structure 10 will be realized with an increasing number of rows. However, for purposes of the description herein, and the test structures, the aspects of the exemplary embodiments will generally be described with respect to the use of arrays having three to five rows, inclusive of end points.

The optimized dimensions of the Archimedean structure 402 shown in FIGS. 4 and 7 yield a waveguide transition with low power leakage when the spacing 406 between adjacent pillars 408 is less than or below approximately 0.0088a.

Figure 8:
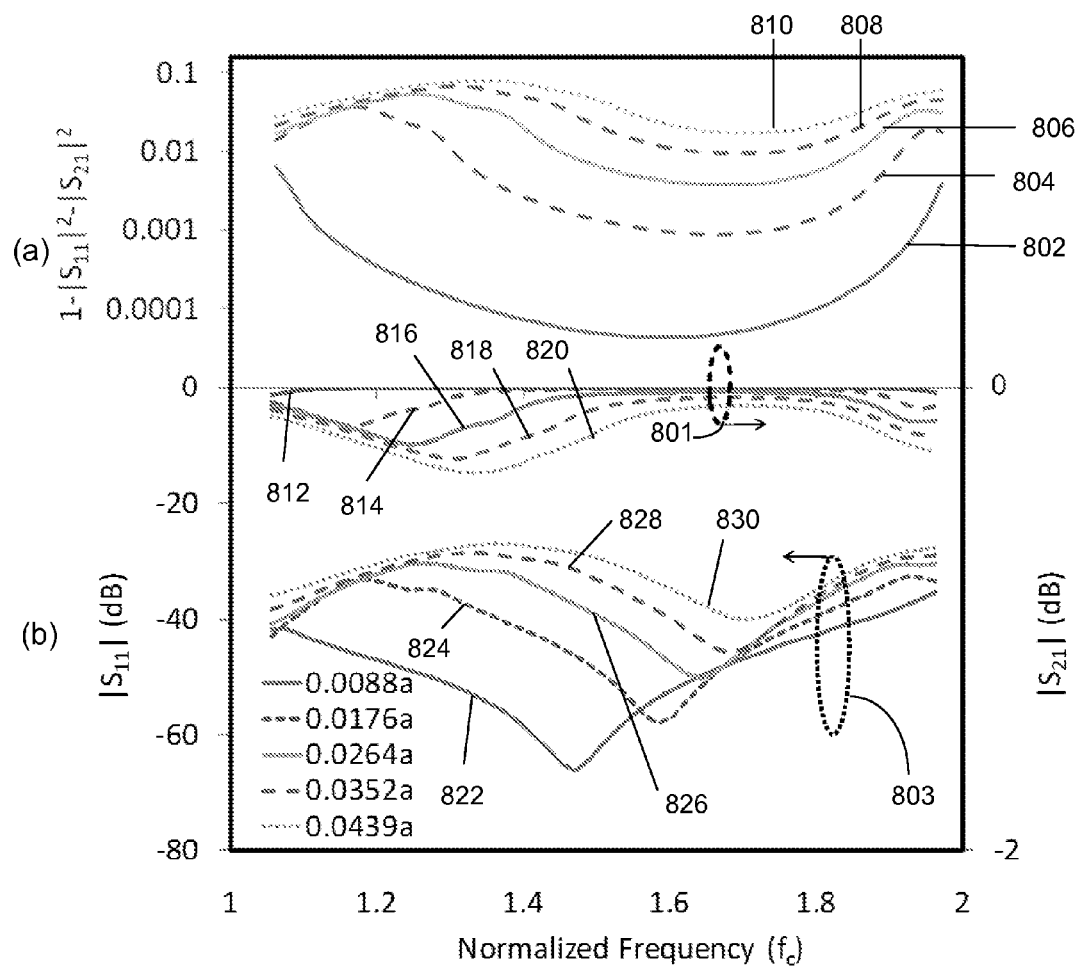
FIGS. 8(a) and 8(b) illustrate simulated power leakage, transmission, and reflection for an exemplary Cartesian tiling configuration in a photonic choke joint incorporating aspects of the exemplary embodiments.

FIGS. 8(a) and 8(b) illustrate the simulated power leakage, transmission and reflection of the Archimedean tiling structure 402. It is noted that, for this simulation, three rows of pillars 408 are used where a diameter 404 of each pillar 408 is approximately 0.18a. The spacing 406 between adjacent pillars 408 in this example is approximately 0.68a. The parameter that is varied in FIGS. 8(a) and 8(b) is the gap 16 between the non-contacting surfaces of the flanges 100, 200, which is in the range of approximately 0.0088a to 0.0439a. FIG. 8(a) illustrates the total power lost, which is the total power less the power reflected and transmitted by the structure 402. In FIG. 8(b), the set of curves 801 illustrates the power transmission loss in [dB], with reference to the right axis, while the set of curves 803 illustrate the power reflection from the joint 14, with reference to the left axis. Lines 802, 812 and 822 are for a gap spacing of 0.0088a. Lines 804, 814 and 824 are for a gap spacing of 0.0176a. Lines 806, 816 and 826 are for a gap spacing of 0.0264a. Lines 808, 818 and 828 are for a gap spacing of 0.0352a. Lines 810, 820 and 830 are for a gap spacing of 0.0439a. FIGS. 8(a) and 8(b), as well as FIGS. 6(a) and 6(b), illustrate the sensitivity that is needed to ensure proper operation of the waveguide structure 10. If the surfaces of the flanges 100, 200 that make up the waveguide structure 10 touch, that is ideal. However, as performance gradually degrades with finite and realizable separations between the two flanges 100, 200, as is shown in FIGS. 6(a), 6(b), 8(a), and 8(b).

Figure 9:
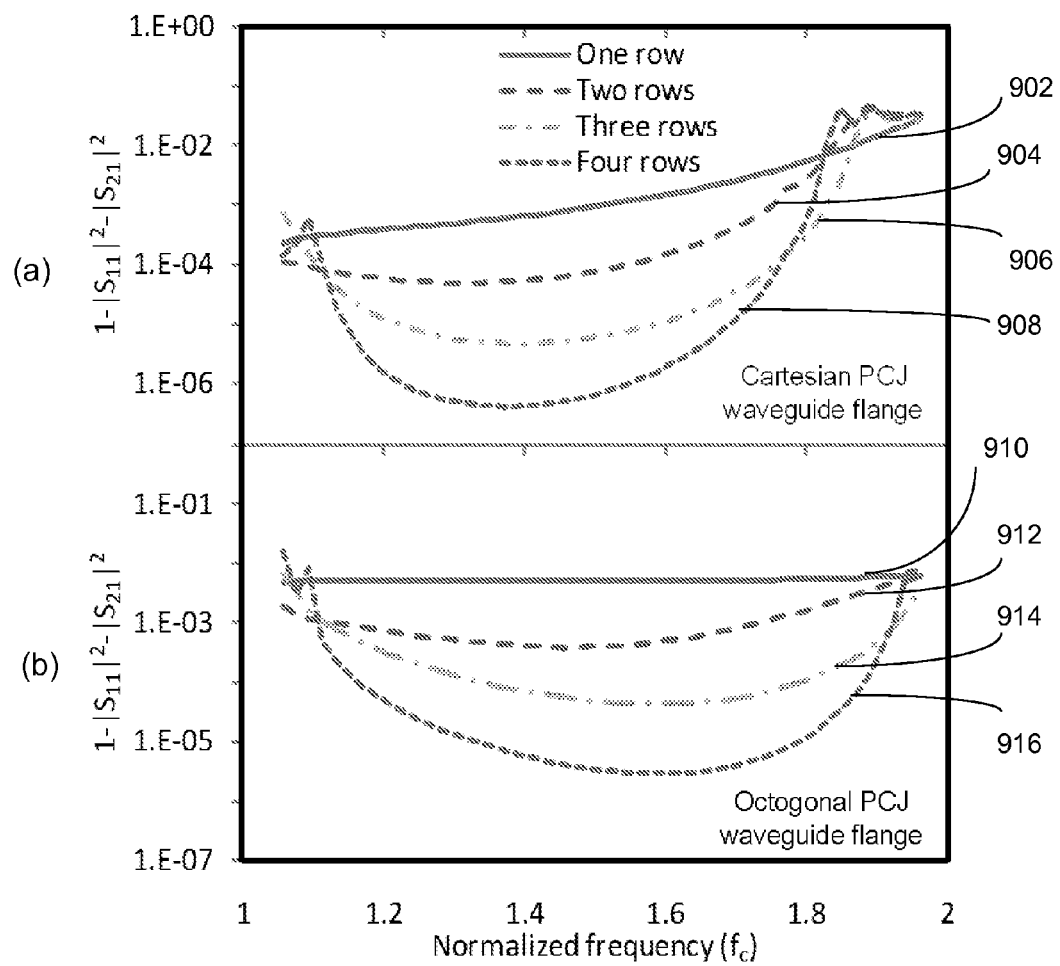
FIGS. 9(a) and 9(b) illustrate the modeled frequency response of the power leakage for exemplary photonic choke joints incorporating Cartesian and Archimedean tiling configurations, respectively, with different numbers of rows of pillars.

As noted above, the power leakage of the waveguide structure 10 is generally dependent on the number of rows 206 of pillars 208. As the number of rows 206 increases, for both the Cartesian and Archimedean tiling configurations, the power leakage is substantially reduced around the center of the operating band. However, the number of rows has little effect near the upper and lower end of the operating bandwidth. An example of this is illustrated in FIGS. 9(a) and 9(b), which illustrates the frequency response of power leakage for the Cartesian and Archimedean waveguide structures described herein, having different numbers of rows 206 of pillars 208. In FIG. 9(a), lines 902, 904, 906, and 908 represent the frequency response for one, two, three, and four rows, respectively, in a Cartesian tiling configuration of a waveguide structure 10 incorporating aspects of the exemplary embodiments. In FIG. 9(b), lines 910, 912, 914, 916 represent the frequency response for one, two, three, and four rows, respectively, in an Archimedean tiling configuration in a waveguide structure 10 incorporating aspects of the exemplary embodiments. For practical purposes, a finite number of rows 206 of pillars 208 can be used in the waveguide structure 10, while maintaining a low loss interface.

In one exemplary embodiment, the waveguide structure 10 is fabricated from oxygen free copper. The square waveguide 12 is realized via electroforming. Generally, the designs for the waveguide structure 10 incorporating aspects of the exemplary embodiments are based on the WR22.4 waveguide standard, where $f_c$=26.35 GHz, although in alternate embodiments, other applicable waveguide standards are contemplated as well.

The pillars 208 are reflective and depending upon the frequency band of interest, can be realized in a variety of different methods. For example, for low frequency applications, i.e., microwave, one fabrication technique would be direct machining from metal. At higher frequencies, such as millimeter wave, submillimeter wave and higher, micro-machined silicon that is subsequently coated with an optically thick low loss metal layer via evaporation or electroplating can additionally be used. At the highest frequencies, micro-machining would be a preferred approach. Alternatively, the pillars 208 can be formed by making a mandrel and electroforming, forming a metal surface under high pressure with a mold, or three-dimensional printing techniques. In alternate embodiments, any suitable pillar fabrication technique can be used depending on the required feature size and subsequent tolerance requirements.

The aspects of the exemplary embodiments provide a photonic choke joint structure for waveguides. The photonic choke joint structure of the exemplary embodiments suppresses power leakage at the waveguide joint while reducing the joint's mechanical stress. The optimal designs, which include both Cartesian and Archimedean tiling of pillars structures, exhibit very low loss and have broadband responses that cover the full square waveguide band up to approximately 2 $f_c$.

The aspects of the exemplary embodiments have several commercial applications and the waveguide structure exemplary herein can be used as a thermal break for telecommunication equipment and instruments. The aspects of the exemplary embodiments can also be used for non-destructive testing for thin film materials. Additionally, the aspects of the exemplary embodiments can be used in waveguide switches, phase shifters and rotating feed networks, since these applications require reliable and low-loss rotatable joints. The leakage due to the finite gap at the waveguide joint can be suppressed. The measured power leakage through the waveguide structure of the exemplary embodiments is typically less than 3% in the operating bandwidth.

The aspects of the exemplary embodiments provide a four-fold and eight-fold symmetry photonic choke structure as a dual-polarization waveguide interface that is scalable, can be used in various waveguide standards and provides several advantages over the existing arts. First, it can be used to provide a thermal break for a waveguide interface. In addition, the spacing between the two flanges of the waveguide PCJ does not significantly affect the waveguide response, as long as the spacing is controlled below a certain value. The waveguide structure of the exemplary embodiments can also preserve the symmetry of the dual-polarized waveguide response. The waveguide structure of the exemplary embodiments can also be used as a housing for planar circuits that enhance the functionality of the waveguide. Examples of waveguide applications that incorporate planar circuits include, for example, filters and dual-polarized antenna feeds.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any exemplary form or embodiment of the invention may be incorporated in any other exemplary or described or suggested form or embodiment as a general matter of design choice. It is the intention, therefore, to be limited only as indicated by the scope of the claims appended hereto.

What is claimed is:

1. A waveguide interface structure, the waveguide interface structure comprising:
   a first flange member;
   a second flange member; and a waveguide member disposed in each of the first flange member and second flange member, the first flange member and the second flange member configured to be coupled together in a spaced-apart relationship separated by a gap, the first flange member having a substantially smooth surface, and the second flange member having an array of two-dimensional pillar structures formed therein.

2. The waveguide interface structure of claim 1, where a pattern of the array of two-dimensional pillar structures comprises a Cartesian or Archimedean tiled pattern.

3. The waveguide interface structure of claim 2, wherein the tiled pattern has a symmetry that is at least four-fold.

4. The waveguide interface structure of claim 2, wherein the waveguide member comprises a square waveguide member.

5. The waveguide interface structure of claim 4, wherein each pillar in the Cartesian tiled pattern is rotated approximately 45 degrees relative to a wall of the square waveguide member.

6. The waveguide interface structure of claim 5, wherein a width of each pillar in the Cartesian pattern is approximately 0.4a, and a spacing between adjacent pillars is approximately 0.68a, where "a" is the waveguide width.

7. The waveguide interface structure of claim 1, wherein the array of two-dimensional pillar structure comprises at least three rows of pillar structures.

8. The waveguide interface structure of claim 1, wherein a size of the gap is in the range of approximately 0.0088a to and including 0.0439a, where "a" is the waveguide width.

9. The waveguide interface structure of claim 1, wherein the waveguide structure comprises a metallic structure.

10. The waveguide interface structure of claim 1, wherein the waveguide structure is a dual polarization waveguide.

11. A photonic choke joint, the photonic choke joint comprising:

a first flange member having a substantially flat surface;

a second flange member having a plurality of pillar structures formed therein;

a square dual-polarization waveguide disposed in each of the first and second flange members, and a pattern of the plurality of pillar structures comprises a Cartesian tiling pattern.

12. The photonic choke joint of claim 11, wherein the plurality of pillar structures comprises at least three rows of pillar structures.

13. The photonic choke joint of claim 11, wherein each pillar structure is rotated approximately 45 degrees relative to the square waveguide.

14. The photonic choke joint of claim 11, wherein a width of each pillar is approximately 0.4a and a spacing between pillars is approximately 0.68a, where "a" is a waveguide width.

15. The photonic choke joint of claim 11, wherein a height of each pillar is approximately 0.037a and a spacing between the first flange and the second flange is approximately 0.0088a, where "a" is a waveguide width.

16. A photonic choke joint, the photonic choke joint comprising:

a first flange member having a substantially flat surface;

a second flange member having a plurality of pillar structures formed therein, a pattern of the pillar structures comprising an Archimedean tiling pattern; and a dual-polarization waveguide disposed in each of the first and second flange members.

17. The photonic choke joint of claim 16, wherein the Archimedean pattern comprises a quasi-crystal tiling pattern.

18. The photonic choke joint of claim 17, wherein a number of rows of pillar structures in the Archimedean pattern is at least three.

19. The photonic choke joint of claim 16, wherein a diameter of each pillar is approximately 0.18a and a distance between adjacent pillars is approximately 0.68a, where "a" is a waveguide width.

20. The photonic choke joint of claim 16, wherein a spacing between the first flange and the second flange is less than 0.0088a, where "a" is a waveguide width.

* * * * *